3,099,082
METHOD OF MAKING WRITING TIPS FOR
BALL POINT PENS
Ernst Johan Jens Henriksen, 1 Alpenstrasse,
Lucerne, Switzerland
Filed Nov. 15, 1960, Ser. No. 69,428
5 Claims. (Cl. 29—523)

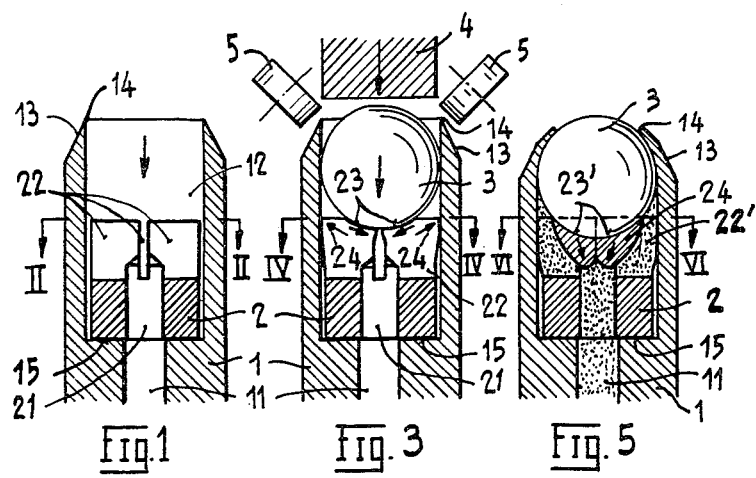
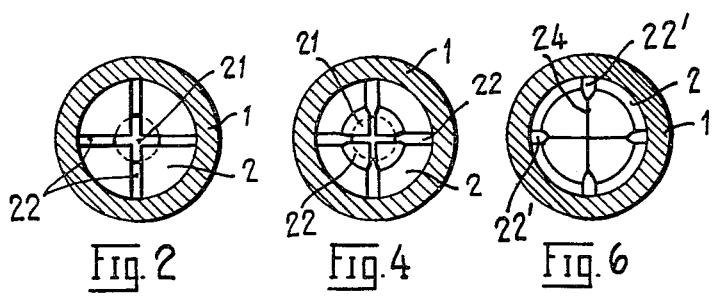
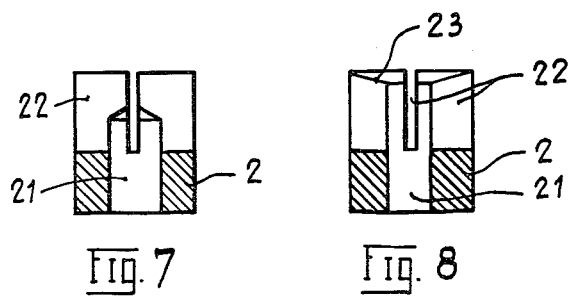

This invention relates to a method of making ball point pens, and more particularly to the writing tip in which the ball is rotatably mounted on a part-spherical seating.

This application is a continuation-in-part of my co-pending application Serial No. 666,433, filed June 18, 1957, now Patent No. 2,983,253, for "Writing Tips for Ball Point Pens."

It is an object of the invention to provide a writing tip for a ball point pen which can readily be produced by mass production methods and, at the same time, enables the ball to be rotatably mounted with the high degree of precision which is necessary in such pens.

According to the invention the part-spherical seating surface on which the ball is rotatably mounted is formed in a separate insert after the insert has been disposed in the tip element. Alternatively, the seating surface may be partly formed in the insert before the insert is placed in the tip element and its formation completed after the disposal of the insert in the tip element.

The insert may suitably consist of a cylindrical member which is disposed in a bore at one end of a tubular part and is formed with an ink feeding passage, or passages, communicating with the interior of the tubular part and with the seating surface for the ball. The feeding passages may consist of a central axial bore which extends partly or completely through the insert and a number of radial slots extending from the seating surface and communicating with the axial bore.

In order to simplify the manufacture and assembly of the tip element, the diameter of the insert may be slightly less than the diameter of the bore in which it is disposed, in which case the clearance between the outer periphery of the insert and the inner periphery of the bore should preferably be between 0.01 and 0.05 mm. If the diameter of the insert is less than the diameter of the bore, the insert is expanded either by pressing the ball into the insert or in a preceding operation.

A tip element according to the invention is illustrated, by way of example, in the accompanying drawing, in which:

FIG. 1 is a cross-section through the tip element showing the insert disposed in the bore;

FIG. 2 is a cross-section on the line II—II of FIG. 1;

FIG. 3 is a cross-section similar to FIG. 1 showing the ball partly pressed into the insert;

FIG. 4 is a cross-section on the line IV—IV of FIG. 3 with the ball removed;

FIG. 5 is a view similar to FIGS. 1 and 3 showing the ball mounted in the tip element and ready for use;

FIG. 6 is a cross-section on the line IV—IV of FIG. 5 but with the ball removed;

FIG. 7 is a detail view of the insert in FIG. 1; and

FIG. 8 is a detail view of a slightly modified form of insert.

Referring to FIGS. 1–6, the tip element comprises a tubular part 1 having an ink feeding conduit 11 which is widened out at its front end by a bore 12 to form a shoulder 15 in which an insert 2, which is of slightly smaller diameter than the bore, is positioned. The insert 2 has an ink feeding channel 21 which is aligned with the ink feeding conduit 11 and extends only partly through the insert. The upper end (in FIG. 1) of the insert is provided with radial slots 22 which intersect in the center of the insert and extend down into the bore 21, so as to afford a passage for the ink from the feeding conduit 11 to the ball.

As shown in FIGS. 3 and 4, the ball 3 is placed in the bore 12 and is pressed in the direction of the arrows into the insert 2 by means of a pressure punch 4. As the ball is pressed into the insert, the marginal portions of the insert are expanded outwardly as indicated by the arrows 24, so that the insert is firmly positioned in the bore 12 of the tip 1. At the same time the edges of the slots 22 are forced inwardly within the range of the spherical seating surface 23 which is formed as the ball is pressed into the insert, as shown in FIG. 4.

Pressure on the ball is continued until it is in the position shown in FIG. 5, when the lip 13, 14 of the tip 1 is also pressed into contact with the ball by the spinning tools 5, and the ball is held in position and is rotatable on its seating 23 which accurately conforms to the spherical shape of the ball. The reservoir 11 need then only be filled with ink paste which passes through the bore 21 and the radial slots 22 of the insert and uniformly inks the ball 3.

FIGS. 5 and 6 show, how, when the ball has been firmly pressed into the insert, the radial slots 24 are shown completely closed over the area of the spherical seating surface 23 but remaining open at the circumferential portions 22′ which are in communication with the bore 21 and the ink reservoir 11. However, the pressing of the ball inwardly may be stopped before the slots 24 become completely closed.

FIG. 7 shows the insert of FIG. 1 in which the central bore 21 does not extend right through the insert but stops at a distance from the upper end. The radial slots are then sufficiently deep to communicate with the bore in order to provide a feed passage for the ink.

FIG. 8 shows a modified form of insert in which the bore 21 extends completely through the insert and in opposition the end face 23 of the insert is preformed to some extent before the insert is placed in the bore of the tip element, so that only a slight deformation is necessary in order to form the seat for the ball after the insert has been positioned in the tip element.

The feeding channels may be formed by axial grooves in the outer periphery of the insert in which case the central bore in the insert can be completely omitted if the grooves are cut deep enough to communicate directly with the feeding conduit 11.

The insert may be made of the same material as that of which the tip portion is made, but it may also be made of a different material, for example, a material having a greater resistance to wear, or a material which offers less friction to the movement of the ball. For example, an alloy containing 920–935 parts per thousand of silver, the rest being copper or, alternatively, of nickel silver, for example 60% copper, 20% zinc and 20% nickel. A material which is commonly used for the tip portion is brass or a bronze such as an aluminum bronze, for example, a copper alloy containing from 5–10% aluminum. It is preferred, however, that the tubular tip portion 1 be of a harder metal than the insert 2 so that the tip portion will not become distorted when the insert is expanded by pressure. Suitable metals would be brass for the tip portion and silver for the insert.

I claim:
1. The method of making a tip element for a ball point pen, comprising the steps of; forming a counterbore in one end of a tubular member to form an annular shoulder therein, forming a generally annular insert, smaller than said counterbore, with an axial bore therein and radial slots at one end thereof communicating with said axial bore, placing said insert in said counterbore, on said shoulder and with its slotted end outermost, thereafter applying pressure to the outer end of said insert to form a part-spherical seat therein and to radially expand said end to tightly fit said counterbore and terminating said pressure-applying step before said radial slots are completely closed.

2. The method defined in claim 1 including the step of placing a spherical ball against the outer end of said insert and wherein the step of applying pressure to the end of said insert is performed by applying pressure to said ball in a direction axial to said counterbore.

3. The method defined in claim 1 wherein said tubular member is formed of a metal harder than the metal of said insert, and limiting the pressure applied to said insert to prevent distortion of said tubular member.

4. The method of making a tip element for a ball point pen, comprising the steps of; forming a counterbore in one end of a tubular member to form an annular shoulder therein, forming a generally annular insert of a size to freely enter said counterbore and having an axial opening therethrough, placing said insert in said counterbore, on said shoulder, forming radial slots across the outer end of said insert and communicating with said axial opening, then applying pressure to the outer end of said insert to form a part-spherical seat therein and to radially expand said insert to tightly fit said counterbore and terminating said pressure-applying step before said radial slots are completely closed.

5. The method of making a tip for a ball point pen, comprising the steps of; forming a tubular pen tip portion with an axial bore; providing an outwardly facing annular surface in said bore adjacent the outer end thereof and having a plurality of slots extending radially thereacross; applying pressure to said annular surface to deform the inner portion thereof to part-spherical shape; and terminating said pressure-applying step after the radially inner ends of said slots have been closed and while the radially outer ends and the bottoms thereof remain open.

References Cited in the file of this patent
UNITED STATES PATENTS

| | | |
|---|---|---|
| 2,409,294 | Martin | Oct. 15, 1946 |
| 2,718,051 | Cloutier | Sept. 20, 1955 |
| 2,891,511 | Fehling | June 23, 1959 |

FOREIGN PATENTS

| | | |
|---|---|---|
| 945,809 | France | Dec. 6, 1948 |